(12) United States Patent
Morreale

(10) Patent No.: US 10,450,959 B2
(45) Date of Patent: Oct. 22, 2019

(54) REGULATION OF THE OIL FLOW IN A COOLING CIRCUIT OF A TURBOMACHINE

(71) Applicant: SAFRAN AIRCRAFT ENGINES, Paris (FR)

(72) Inventor: Serge Rene Morreale, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 189 days.

(21) Appl. No.: 15/498,850

(22) Filed: Apr. 27, 2017

(65) Prior Publication Data

US 2017/0314473 A1 Nov. 2, 2017

(30) Foreign Application Priority Data

Apr. 27, 2016 (FR) ..................................... 16 53748

(51) Int. Cl.
*F02C 7/16* (2006.01)
*F01D 25/20* (2006.01)
*F02C 3/14* (2006.01)
*F02C 7/06* (2006.01)
(Continued)

(52) U.S. Cl.
CPC ............... *F02C 7/16* (2013.01); *F01D 25/125* (2013.01); *F01D 25/20* (2013.01); *F02C 3/14* (2013.01); *F02C 7/06* (2013.01); *F02C 7/36* (2013.01); *F04D 29/053* (2013.01); *F04D 29/056* (2013.01); *F02C 3/04* (2013.01);
(Continued)

(58) Field of Classification Search
CPC ...... F02C 7/16; F02C 3/14; F02C 7/06; F02C 3/04; F01D 25/125; F01D 25/20
See application file for complete search history.

(56) References Cited

U.S. PATENT DOCUMENTS 4,284,174 A * 8/1981 Salvana .................. F01D 25/18
184/6.26
2006/0081419 A1 4/2006 Care et al.
(Continued)

FOREIGN PATENT DOCUMENTS

EP 1 389 671 A2 2/2004
EP 1 933 077 A1 6/2008
(Continued)

OTHER PUBLICATIONS

Pinel, Stanley i, et al. "Comparison Between Oil-Mist and Oil-Jet Lubrication of High-Speed, Small-Bore, Angular-Contact Ball Bearings." NASA/TM-2001-210462, Aug. 2001, ntrs.nasa.gov/archive/nasa/casi.ntrs.nasa.gov/20010090717.pdf. (Year: 2001).*
(Continued)

*Primary Examiner* — Kevin A Lathers
(74) *Attorney, Agent, or Firm* — Oblon, McClelland, Maier & Neustadt, L.L.P.

(57) ABSTRACT

A turbomachine including a turbine shaft supported by at least one bearing, at least one enclosure, housing the bearing of the turbine shaft, an oil cooling circuit of the enclosure including at least one jet configured to inject oil from the cooling circuit into the enclosure, and a regulator configured to regulate the flow of oil in the cooling circuit as a function of an oil temperature at output of the enclosure and a pressure difference at the level of the jet.

16 Claims, 2 Drawing Sheets

Figure 1:
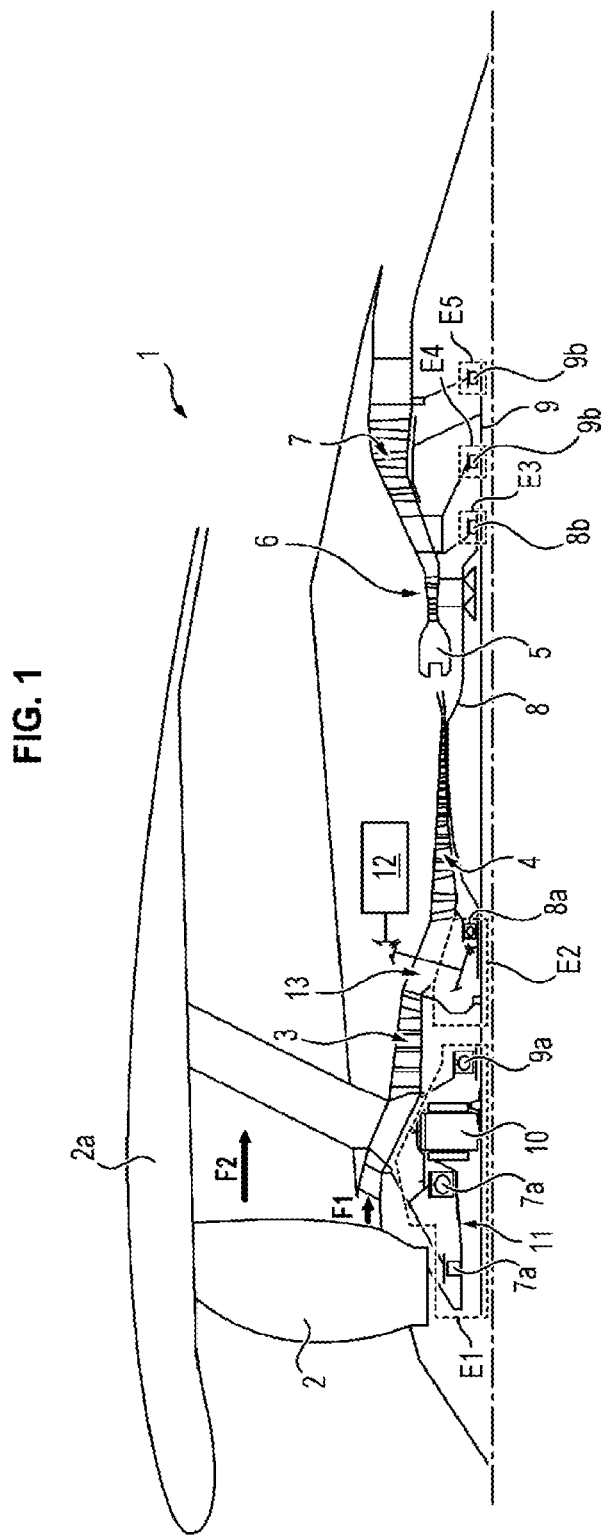

(51) Int. Cl.
   *F02C 7/36* (2006.01)
   *F04D 29/053* (2006.01)
   *F04D 29/056* (2006.01)
   *F01D 25/12* (2006.01)
   *F02C 3/04* (2006.01)

(52) U.S. Cl.
   CPC ...... *F05D 2220/32* (2013.01); *F05D 2240/35* (2013.01); *F05D 2240/60* (2013.01); *F05D 2260/40311* (2013.01); *F05D 2260/98* (2013.01); *F05D 2270/3062* (2013.01)

(56) References Cited

U.S. PATENT DOCUMENTS

| | | |
|---|---|---|
| 2009/0299535 A1 | 12/2009 | Delaloye |
| 2010/0028127 A1 | 2/2010 | Cornet et al. |
| 2013/0192242 A1* | 8/2013 | Davis ............... F01D 21/003 60/772 |

FOREIGN PATENT DOCUMENTS

| | | | |
|---|---|---|---|
| EP | 2 025 881 A2 | 2/2009 | |
| FR | 2987077 A1 * | 8/2013 | ............. F01D 25/18 |
| WO | WO 94/20739 A2 | 9/1994 | |

OTHER PUBLICATIONS

French Preliminary Search Report dated Jan. 27, 2017 in Patent Application No. 1653748 (with English language Translation of Categories of Cited Documents).

\* cited by examiner

REGULATION OF THE OIL FLOW IN A COOLING CIRCUIT OF A TURBOMACHINE

FIELD OF THE INVENTION

The present invention relates to a device for cooling oil for a turbomachine and a turbomachine equipped with such a device.

TECHNOLOGICAL BACKGROUND

A turbomachine comprises equipment which must be lubricated and/or cooled, such as for example bearing blocks, reducing gears, electric machines and their respective enclosures. For this, the turbomachine comprises a lubrication group feeding an oil circuit in which the oil plays the role of lubricant and heat-exchange fluid. Thermal power transmitted by the equipment to the oil is then discharged by means of heat exchangers of fuel-oil type and/or air-oil type.

The lubrication group comprises especially a pump which is driven by an accessory gearbox, well known to the expert under the name "Accessory Gear Box" (AGB). The AGB is connected via a transmission shaft to a shaft of the turbomachine, generally the high-pressure shaft, to power these different accessories.

Currently, the cooling of equipment is dimensioned to take-off to the extent where it is about the flight phase which generates the most thermal power. For other flight phases the cooling of equipment varies as a function of the speed of rotation of the high-pressure shaft to the extent where it drives the pump of the lubrication group via the AGB.

But it eventuates that, outside the take-off phase, the cooling of different equipment is greater than necessary, which generates substantial thermal losses and pressure losses in exchangers and substantially reduces the yield of the turbomachine. The cooling of equipment is therefore adapted neither to the flight phase of the turbomachine nor to the type of equipment to be cooled.

SUMMARY OF THE INVENTION

An aim of the invention is therefore to propose a system for adjusting the cooling of equipment of a turbomachine as a function of flight phases to reduce thermal losses and to improve the yield of the turbomachine.

For this, the invention proposes a turbomachine comprising:
a turbine shaft assembly supported by at least two bearings,
at least one enclosure, housing at least one of the bearings of the turbine shaft assembly, and
a cooling oil circuit of the enclosure, said cooling circuit comprising at least one jet configured to inject oil from the cooling circuit into the enclosure, and
a flow regulator, configured to regulate oil flow in the cooling circuit as a function of an oil temperature at output of the enclosure and a pressure difference at the level of the jet.

Some preferred, though non-limiting, characteristics of the turbomachine described above are the following, taken individually or in combination:
the turbine shaft assembly comprises a low-pressure shaft and a high-pressure shaft, the enclosure housing a rear bearing of the high-pressure shaft,
the turbomachine also comprises a combustion chamber, the enclosure being positioned under said combustion chamber, the flow regulator is configured to regulate the flow of oil in the cooling circuit such that the pressure difference at the level of the jet is greater than or equal to a predefined pressure difference, wherein said predefined pressure difference can be equal to 0.9 bars,
the flow regulator is configured to regulate the flow of oil in the cooling circuit such that the temperature at output of the enclosure is less than or equal to a maximal predefined admissible temperature, wherein said maximal admissible temperature can be equal to 180° C.,
the turbine shaft assembly comprises a low-pressure shaft and a high-pressure shaft, the turbomachine also comprising a fan shaft and a reduction mechanism coupling the low-pressure shaft and the fan shaft, the reduction mechanism comprising an epicyclic or planetary reducing gear and having a reduction ratio of between 2.5 and 5,
the turbomachine has a dilution rate greater than 10, for example between 12 and 18,
the fan shaft is supported by at least one fan bearing, the low pressure shaft is supported by at least one front bearing and a rear bearing and the high-pressure shaft is supported by at least one front bearing and a rear bearing, the turbomachine also comprising: a first enclosure housing the at least one fan bearing, the reduction mechanism and a front bearing of the low-pressure shaft, a second enclosure housing the front bearing of the high-pressure shaft and optionally an angle gearbox between the high pressure shaft and a transmission shaft of an accessory gearbox and a third enclosure housing the rear bearing of the low-pressure shaft, the first, the second and the third enclosure being cooled by the cooling system,
the flow regulator is configured to regulate the oil flow in the cooling circuit such that: a difference between the input temperature and the output temperature of the reduction mechanism is between 30° C. and 70° C., and/or a difference between the input temperature and the output temperature at the level of the bearings is between 70° C. and 80° C., and/or a difference between the input temperature and the output temperature at the level of the enclosures is between 70° C. and 80° C., and/or a maximal temperature at output of the reduction mechanism is less than or equal to 150° C., and/or a maximal temperature at output of the bearings is less than or equal to 180° C., and/or a maximal temperature at output of the enclosures is less than or equal to 180° C.,
a jet is attached to each enclosure and the flow regulator is configured to regulate the oil flow in the cooling circuit as a function of the pressure difference at the level of each jet, and/or
the flow regulator comprises an oil supply pump having variable geometry or a derivation.

BRIEF DESCRIPTION OF DIAGRAMS

Figure 2:
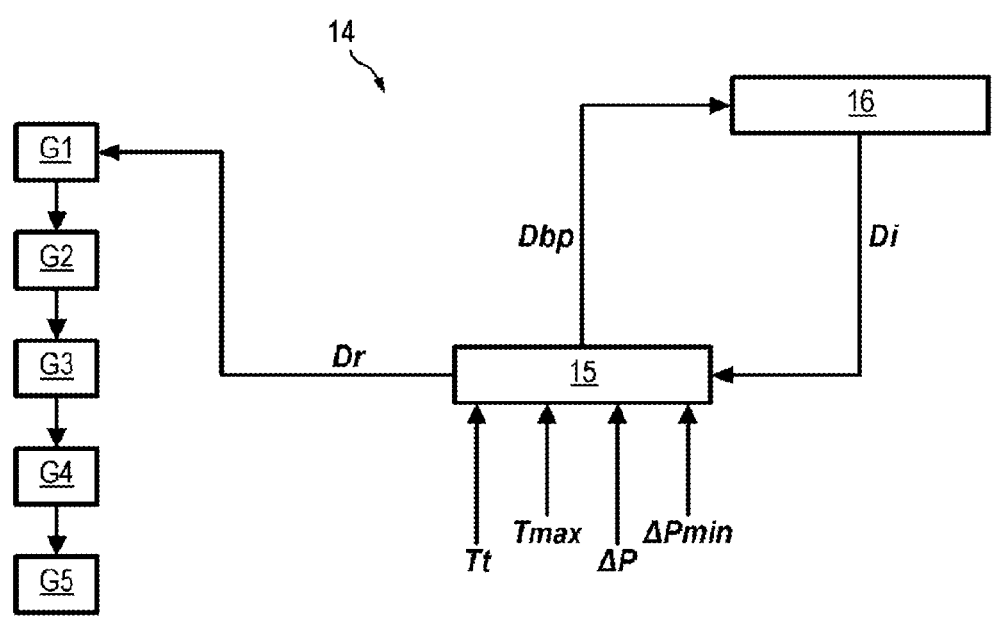

Other characteristics, aims and advantages of the present invention will emerge from the following detailed description and with respect to the attached diagrams by way of non-limiting examples and in which:
FIG. 1 is a view in partial section of an embodiment of a turbomachine according to the invention, and
FIG. 2 is a diagram illustrating an embodiment of a flow regulator which can be executed in the turbomachine of FIG. 1.

DETAILED DESCRIPTION OF AN EMBODIMENT

In conventional terms a turbomachine 1 comprises a fan 2 housed in a fan casing 2, an annular primary flow space and an annular secondary flow space.

The primary flow space passes through a primary body comprising one or more compressor stages, for example a low-pressure compressor 3 and a compressor high-pressure 4, a combustion chamber 5, one or more turbine stages, for example a high-pressure turbine 6 and a low-pressure turbine 7, and a gas discharge pipe.

Typically, the high-pressure turbine 6 drives the high-pressure compressor 4 in rotation by means of a first shaft, called high-pressure shaft 8, while the low-pressure turbine 7 drives the low-pressure compressor 3 and the fan 2 in rotation by means of a second shaft, called low-pressure shaft 9. The low-pressure shaft 9 is generally housed in the high-pressure shaft 8.

The fan 2 comprises a fan disc provided with fan blades 2 at its periphery which, when rotating, draw air flow into the primary and secondary flow spaces of the turbomachine 1. The fan disc is supported by the low-pressure shaft 9 which is centred on the axis of the turbomachine 1 by a series of bearings and is driven in rotation by the low-pressure turbine 7.

To improve the propulsive yield of the turbomachine 1, and reduce its specific consumption and the noise emitted by the fan 2, the turbomachine 1 can have a high dilution rate ("bypass ratio", which corresponds to the ratio between the rate of the primary flow F1 (cold) and the rate of the secondary flow F2 (hot, which passes through the primary body)). High dilution rate here means a dilution rate greater than 10, for example between 12 and 18.

For this purpose, the fan 2 is disconnected from the low-pressure turbine 7, effectively independently optimising their respective speed of rotation. For example, the disconnecting can be done by means of a reducing gear 10, such as an epicyclic reduction mechanism ("star gear reduction mechanism") or planetary ("planetary gear reduction mechanism"), placed between the upstream end (relative to the gas flow direction in the turbomachine 1) of the low-pressure shaft 9 and the fan 2. The fan 2 is driven by the low-pressure shaft 9 by means of the reduction mechanism 10 and an additional shaft, called fan shaft 11, which is fixed in between the reduction mechanism 10 and the disc of the fan 2.

This disconnecting reduces the speed of rotation and the pressure ratio of the fan 2 ("fan pressure ratio"), and boosts power extracted by the low-pressure turbine 7.

In an embodiment, the reduction mechanism 10 comprises an epicyclic reduction mechanism 10. The reduction ratio of the reduction mechanism 10 is preferably between 2.5 and 5.

The diameter of the fan 2 can be between eighty inches (203.2 centimeters) and one hundred inches (254.0 centimeters), preferably between eighty inches (203.2 centimeters) and ninety inches (228.6 centimeters).

The turbomachine 1 also comprises an AGB 12 which can be fixed onto the casing of the engine, for example in the nacelle 2a enclosing the fan 2 or in the compartment central between the vein of the primary flow F1 and the vein of the secondary flow F2, and which mechanically drives a series of accessories by harvesting the necessary drive power on an engine shaft, generally the high-pressure shaft 8. Of these accessories the AGB 12 especially drives a lubrication group comprising an oil supply pump. An oil circuit connects the pump to the jets G1-G5 which target the elements to be lubricated and cooled contained in the enclosures E1-E5, respectively.

The invention will be described more particularly hereinbelow in the case of a turbomachine 1 having double flow, comprising a high dilution rate and a reducing gear of the epicyclic reduction mechanism 10 type. But this is not limiting, as the invention applies to any type of turbomachine 1, irrespective of its dilution rate, the presence of a reducing gear and the type of reducing gear 10 between the fan 2 and the low-pressure shaft 9.

FIG. 1 in particular illustrates an example of a turbomachine 1 with double flow, comprising an epicyclic reducing gear 10.

As is evident, in the case of such an example of a turbomachine 1, the oil circuit generally cools the epicyclic reducing gear 10, enclosures E1-E5 housing equipment and the AGB 12. From upstream to downstream in the direction of gas flow in the turbomachine 1 the enclosures E1-E5 can comprise:

a first enclosure E1 housing the bearings 7a of a fan 2, the epicyclic reducing gear 10 and the front bearing 9a of the low-pressure shaft 9, a second enclosure E2, located upstream of the compressor high-pressure 4, housing the front bearing 8a of the high-pressure shaft 8 and the angle gearbox between the high-pressure shaft 8 and the transmission shaft 13 of the AGB 12 (schematically illustrated in FIG. 1), a third enclosure E3, located under the combustion chamber 5 11 and the high-pressure turbine 6, generally housing the rear bearing 8b of the high-pressure shaft 8, and a fourth and a fifth enclosure E4 and E5, located under the low-pressure turbine 7 and the exhaust housing, respectively, accommodating the rear bearings 9b of the low-pressure shaft 9.

It is evident that this configuration of enclosures E1-E5 is just one possible embodiment, the turbomachine 1 which can comprise one or more additional enclosures (the front bearing 9a of the low-pressure shaft 9 which can for example be housed in a dedicated enclosure) or the various equipment and bearings which can be distributed variously in the enclosures E1-E5 (the front bearing 9a of the low-pressure shaft 9 which can for example be housed in the second enclosure E2 with the front bearing 8a of the high-pressure shaft 8).

It is known that the thermal power transmitted to the oil is all the greater, since its rate is considerable. The invention proposes therefore delivering the oil flow strictly necessary for cooling the different elements (reducing gear 10, bearings 7a, 8a, 8b, 9a, 9b, etc.) of the turbomachine 1, within the admissible limit of the temperature by each piece of equipment and by the oil itself, to increase its yield.

It is evident that the lubrication group generally comprises a single supply pump, the distribution of the oil in the oil circuit being determined by the output diameter of the jets G1-G5 at the level of each piece of equipment to be cooled. Only the rate of the pump can be modified therefore.

To deliver the oil flow strictly necessary for cooling, the turbomachine 1 comprises, downstream of the oil tank, a flow regulator configured to regulate the rate of the pump according to the flight phase. This regulation is operated as a function of:

the maximal admissible temperature exiting the third enclosure E3 (located under the combustion chamber 5), and the minimal pressure difference $\Delta P_{min}$ at the terminals of the jets G1-G5.

In other words, the flow regulator determines the oil flow to be supplied to the pump of the group lubrication to ensure that the temperature at output of the third enclosure E3 is less than or equal to its maximal temperature, given that the rate must be adequate to ensure that the pressure difference $\Delta P$ at the terminals of the jets G1-G5 is greater than the minimal pressure difference $\Delta P_{min}$. Monitoring the pressure difference ΔP at the terminals of the jets G1-G5 also lubricates the enclosures E1-E5 as needed and prevents any unuseful heating.

The temperature at the outlet of the third enclosure E3 is in fact the most disadvantageous temperature in the cooling circuit: by determining the oil flow and given this maximal temperature, it is possible to guarantee that the other equipment is necessarily sufficiently cooled.

The maximal temperature at output of the third enclosure E3 can be 180° C.

Also the minimal pressure difference ΔPmin at the terminals of the jets G1-G5 is preferably equal to 0.9 bars.

When the pressure difference ΔP at the terminals of the jets G1-G5 is less than the difference in minimal pressure ΔPmin, the flow regulator 14 increases the oil flow in the cooling circuit to boost said pressure difference ΔP and attain the predetermined minimal threshold ΔPmin of pressure difference at the terminals of the jets G1-G5 (for example 0.9 bars). This effect of increase in the rate is to increase thermal power transmitted to the oil and therefore reduce the temperature at the terminals of the different equipment, including the temperature leaving the third enclosure E3.

Similarly, when the temperature leaving the third enclosure E3 exceeds the maximal admissible temperature, the flow regulator 14 increases the oil flow so as to lower said temperature, the effect of which is to increase the pressure difference ΔP at the terminals of the jets G1-G5.

In this way, in all cases, regulation of the rate respects the fixed conditions at the terminals of the jets G1-G5 and at output of the third enclosure E3.

For reduction in thermal power to be maximal, the rate regulation must relate to all the vector functions of thermal rejection. The size of equipment (ACOC (for Air Cooled Oil Cooler), FCOC (for Fuel Cooled Oil Cooler), deicer casing (if oil-based deicing), feed pump and recovery pumps) remains unchanged to the extent where it remains set from the dimensioning point (that is, the take-off phase). Yet these different functions presently work in better conditions when a lesser rate is required or is at least possible.

In this way, the yield of these different functions is improved and the pressure losses of the exchangers are reduced (at exchanged iso power, the air-oil exchanger (ACOC) needing less air flow).

Also, the ratio between the air flow and the oil flow of the scavenge pumps of each enclosure E1-E5 is also augmented. It is clear in particular that the increase in the ratio between the air flow and the oil flow of the scavenge pumps improves recovery of the oil in the enclosures E1-E5 and therefore reduces the risk of retention of oil (splashing) in all flight phases (with the exception of the take-off phase which remains the dimensioning phase for these functions such that the oil flow during this phase is unchanged).

Regulation of the rate can be performed by means of a flow regulator 14 comprising an oil supply pump having conventional variable geometry or a derivation comprising a valve 15 which sends back a fraction of the oil flow to the oil tank 16. Irrespective of the embodiment, the flow regulator 14 can be controlled by a computer (of FADEC type).

Information on the temperature at output of the third enclosure E3 can be obtained by means of a progressive sensor, configured to measure said temperature substantially continuously or at predetermined time intervals. According to temperature, the flow regulator 14 can therefore modify the oil flow substantially continuously as per an arithmetic law.

The information on the pressure difference ΔP as such can be obtained by means of progressive pressure sensors placed at the terminals of the jets G1-G5, or as a variant by means of all-or-nothing sensors (AON type) placed at said terminals and dimensioned so as to detect the minimal pressure difference ΔPmin. In this variant, regulation of the rate by the flow regulator 14 is not progressive and occurs only when the pressure difference ΔP becomes less than the minimal pressure difference ΔPmin. The flow regulator 14 can correct the oil flow by increasing it to a value which can be predefined (and correspond for example to the oil flow at take-off phase).

According to yet another variant, information on the pressure difference ΔP can be obtained by means of a sensor (progressive or all or nothing) placed at the level of the FADEC and connected to a tube, said tube communicating a pressure measured at a butterfly valve which actions an input valve.

An embodiment of a flow regulator 14 comprising a derivation is illustrated in FIG. 2. The derivation comprises for example a valve 15, placed between the oil tank 16 and the first enclosure (in the direction of flow of oil in the cooling circuit). The valve 15 is in fluid communication both with the enclosures E1-E5 and also part with the oil tank 16. When operating, oil is pumped from the oil tank 16 at an initial rate Di, which corresponds to the oil flow necessary in takeoff phase to cool the equipment. The oil then passes through the valve 15. Some of the oil transmitted in this way is distributed via the valve 15 between the jets G1 to G5 linked to the enclosures E1-E5, via a main circuit and at a rate known as regulated Dr, which is less than or equal to the initial rate Di, and the oil tank 16, via a secondary bypass circuit and at a rate called Dbp bypass. The ratio between the regulated rate Dr and the bypass rate Dbp is determined by the computer as a function of the measured temperature Tt (in real time) at output of the third enclosure E3 and of the minimal pressure difference ΔPmin at the terminals of the jets G1-G5. Of course, in take-off phase which is dimensioning, the regulated rate Dr is equal to the initial rate Di. But the regulated rate Dr is less than the initial rate Di during other flight phases.

Regulation of the flow of oil in the circuit causes an increase in the temperature on transit of each item of equipment generating thermal power. But by determining the oil flow as a function of the maximal admissible temperature Tmax at output of the third enclosure E3, the temperature which can be reached at the level of the different equipment of the turbomachine 1 remains admissible, without risk of damage to this equipment.

The regulation logic can also be configured to limit the oil temperature to 150° C. at output from meshing of the epicyclic reducing gear 10, irrespective of the operation mode, to ensure the presence of a sufficiently viscous film on contact with the teeth of the reducing gear 10.

The output temperature of oil at the level of each item of equipment depends on its input temperature, which is taken overall at output from the exchanger.

For example, for an oil input temperature which can be between 80° C. and 120° C., the difference in temperature at the level of equipment to be cooled of the turbomachine 1 can remain in the following ranges because of the flow regulator 14:

70° C. to 80° C. at the level of the bearings 7a, 8a, 8b, 9a, 9b

30° C. to 70° C. at the level of the epicyclic reducing gear 10,

30° C. to 70° C. at the level of the different enclosures E1, E2, E4, E5.

Also, the flow regulator 14 is configured such that the maximal admissible temperature is:

less than or equal to 150° C. at output of the epicyclic reducing gear 10 less than or equal to 180° C. at output of the bearings 7a, 8a, 8b, 9a, 9b less than or equal to 160° C. at output of the enclosures E1, E2, E4, E5.

The drop in power is all the greater since the input temperature is low.

For example, there is a gain in thermal power which can reach 9 kW in all flight phases (in particular when the input temperature is close to 80° C.), and of the order of 7 kW at cruise speed, which leads to a considerable increase in the yield of the turbomachine 1.

The invention claimed is:

1. A turbomachine comprising:
a turbine shaft assembly supported by at least two bearings,
at least one enclosure, housing at least one of the bearings of the turbine shaft assembly,
an oil cooling circuit of the enclosure, said cooling circuit comprising at least one jet configured to inject oil from the cooling circuit into the enclosure, and
a flow regulator, configured to regulate oil flow in the cooling circuit as a function of a temperature of the oil at an output of the enclosure and a pressure difference at a level of the jet.

2. The turbomachine as claimed in claim 1, wherein the turbine shaft assembly comprises a low-pressure shaft and a high-pressure shaft, the enclosure housing a rear bearing of the high-pressure shaft.

3. The turbomachine as claimed in claim 1, also comprising a combustion chamber, the enclosure being positioned under said combustion chamber.

4. The turbomachine as claimed in claim 1, wherein the flow regulator is configured to regulate the flow of oil in the cooling circuit such that the pressure difference at the level of the jet is greater than or equal to a predefined pressure difference, said predefined pressure difference which can be equal to 0.9 bars.

5. The turbomachine as claimed in claim 1, wherein the flow regulator is configured to regulate the flow of oil in the cooling circuit such that the temperature at output of the enclosure is less than or equal to an admissible predefined maximal temperature, said admissible maximal temperature which can be equal to 180° C.

6. The turbomachine as claimed in claim 1, wherein the turbine shaft assembly comprises a low-pressure shaft and a high-pressure shaft, the turbomachine also comprising a fan shaft and a reduction mechanism coupling the low-pressure shaft and the fan shaft, the reduction mechanism comprising an epicyclic or planetary reducing gear and having a reduction ratio of between 2.5 and 5.

7. The turbomachine as claimed in claim 6, having a dilution rate between 12 and 18.

8. The turbomachine as claimed in claim 6, having a dilution rate greater than 10.

9. The turbomachine as claimed in claim 6, wherein the fan shaft is supported by at least one fan bearing, the low-pressure shaft is supported by at least one front bearing and a rear bearing and the high-pressure shaft is supported by at least one front bearing and a rear bearing, the turbomachine also comprising:
a first enclosure housing the at least one fan bearing, the reduction mechanism and a front bearing of the low-pressure shaft,
a second enclosure housing the front bearing of the high-pressure shaft and optionally an angle gearbox between the high-pressure shaft and a transmission shaft of an accessory gearbox, and
a third enclosure housing the rear bearing of the low-pressure shaft,
the first, the second and the third enclosure being cooled by the cooling system.

10. The turbomachine as claimed in claim 9, wherein the flow regulator is configured to regulate the oil flow in the cooling circuit such that:
a difference between an input temperature and an output temperature of the reduction mechanism is between 30° C. and 70° C., and/or
a difference between an input temperature and an output temperature at a level of the bearings is between 70° C. and 80° C., and/or
a difference between an input temperature and an output temperature at a level of the enclosures is between 70° C. and 80° C., and/or
a maximal temperature at output of the reduction mechanism is less than or equal to 150° C., and/or
a maximal temperature at output of the bearings is less than or equal to 180° C., and/or
a maximal temperature at output of the enclosures is less than or equal to 180° C.

11. The turbomachine as claimed in claim 9, wherein a jet is associated with each enclosure and the flow regulator is configured to regulate the oil flow in the cooling circuit as a function of the pressure difference at a level of each jet.

12. The turbomachine as claimed in claim 1, wherein the flow regulator comprises an oil supply pump having variable geometry or a derivation.

13. The turbomachine as claimed in claim 1, wherein the flow regulator is configured to regulate the oil flow as a function of a maximal admissible temperature exiting the enclosure.

14. The turbomachine as claimed in claim 13, wherein the flow regulator is configured to regulate the oil flow as a function of a minimal pressure difference at terminals of the jet.

15. The turbomachine as claimed in claim 14, wherein the flow regulator is configured to regulate the oil flow such that, when the pressure difference at the terminals of the jet is less that a minimal pressure difference threshold, the flow regulator is configured to increase oil flow in the cooling circuit to boost said pressure difference and reach the minimal pressure difference threshold.

16. The turbomachine as claimed in claim 15, wherein the flow regulator is configured to regulate the oil flow such that, when the temperature at the output of the enclosure exceeds a maximal temperature threshold, the flow regulator is configured to increase oil flow in the cooling circuit to lower said temperature.

* * * * *

UNITED STATES PATENT AND TRADEMARK OFFICE
CERTIFICATE OF CORRECTION

PATENT NO. : 10,450,959 B2
APPLICATION NO. : 15/498850
DATED : October 22, 2019
INVENTOR(S) : Serge Rene Morreale Page 1 of 1

It is certified that error appears in the above-identified patent and that said Letters Patent is hereby corrected as shown below:

In the Specification

Column 2, Line 19, change "low pressure" to --low-pressure--;
       Line 26, change "high pressure" to --high-pressure--.

Column 5, Line 36, change "deicer" to --de-icer--;
       Line 37, change "deicing" to --de-icing--.

In the Claims

Column 8, Line 52, change "that" to --than--.

Signed and Sealed this
Seventeenth Day of March, 2020

Andrei Iancu
*Director of the United States Patent and Trademark Office*